United States Patent [19]

Lemons

[11] Patent Number: 5,039,180
[45] Date of Patent: Aug. 13, 1991

[54] STORAGE CABINET WITH DISPLACEABLE SHELVING

[76] Inventor: Elmer Lemons, Rte. 3, Box 217B, Mineola, Tex. 75773

[21] Appl. No.: 581,299

[22] Filed: Sep. 12, 1990

[51] Int. Cl.$^5$ .............................................. A47B 49/00
[52] U.S. Cl. ................................................... 312/267
[58] Field of Search ................................ 312/267, 305

[56] References Cited

U.S. PATENT DOCUMENTS

| | | | |
|---|---|---|---|
| 357,918 | 2/1887 | Gilzinger | 312/305 X |
| 2,100,280 | 11/1937 | Goldberger | 312/305 X |
| 2,857,230 | 10/1958 | Soldat | 312/267 |
| 3,094,362 | 6/1963 | Murray | 312/267 |
| 3,192,935 | 7/1965 | Hanifan | 312/267 X |

Primary Examiner—Joseph Falk
Attorney, Agent, or Firm—Daniel Rubin

[57] ABSTRACT

A free-standing shelf type cabinet for the storage of articles is constructed of an enclosed cabinet having a polygonal cross-section and on which at least one access door is provided. Within the cabinet, a plurality of shelves are mounted in a ferris wheel relation enabling the shelves to be progressively displaced to and past the access opening. A detent cooperates with the rotational support for the shelves enabling any selected shelf to be positionably retained at the access opening.

1 Claim, 2 Drawing Sheets

1

STORAGE CABINET WITH DISPLACEABLE SHELVING

FIELD OF THE INVENTION

The field of art to which the invention relates comprises the art of shelf type furniture products for article storage.

BACKGROUND OF THE INVENTION

Shelf type furniture products for storage of articles are available in an abundance of variations and typically are constructed of wood, metal, plastic and/or combinations thereof. Depending on the type of article to be stored and/or the degree of article care to be afforded, the product can be constructed so as to either expose or enclose the shelving. The latter is usually contained within an enclosed cabinet of sorts adapted for either wall mounting or free standing. In a usual enclosed cabinet construction, access to the shelving is provided by doors that hinge, slide, fold or roll.

OBJECT OF THE INVENTION

It is an object of the invention to provide a novel shelf type furniture product for the storage of articles.

It is a further object of the invention to effect the previous object with shelves mounted for displacement within an enclosed cabinet whereby each shelf can be selectively accessed through a single relatively narrow door opening.

It is a still further object of the invention to effect the previous objects with a free-standing cabinet construction in which some or all of the individual shelves are suitably constructed of compartmentalized trays adapted for receipt and storage of audio and/or video cartridge collections.

SUMMARY OF THE INVENTION

This invention relates to a shelf type furniture product for the storage of articles. More specifically, the invention relates to a free-standing cabinet structure having displaceable shelves so as to render each shelf selectively accessible from a convenient but relatively limited access opening in the cabinet.

The foregoing is achieved in accordance with the invention by an enclosed elongated cabinet formed of polygonal cross-section. One face of the polygon represents the top of the cabinet and defines an opening with which a hinged door cooperates for accessing the internal cavity. Within the cabinet are a plurality of longitudinal shelves supported internally in a ferris wheel relation for rotational displacement about a longitudinal axis. Rotation of the shelves can either be by hand or optionally be motor driven while a detent or brake enables securing a selected shelf at an access station opposite the door opening.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
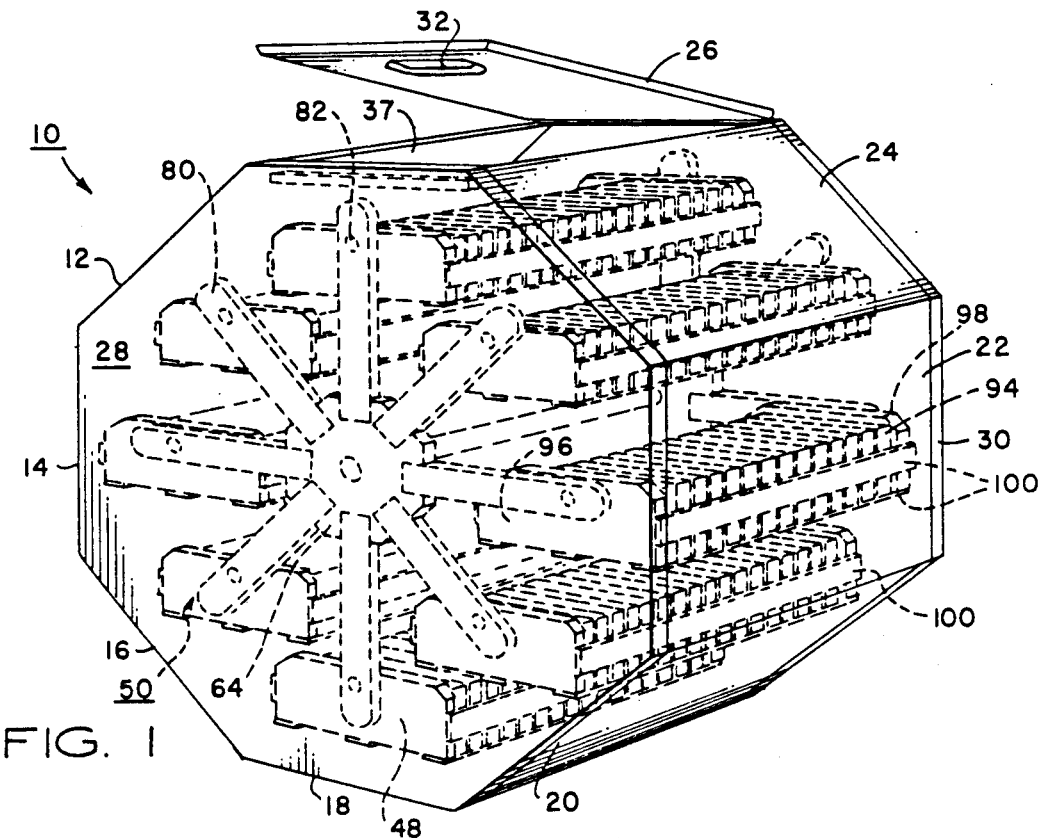
FIG. 1 is an isometric view of a shelf type furniture cabinet constructed in accordance with the invention.
Figure 3:
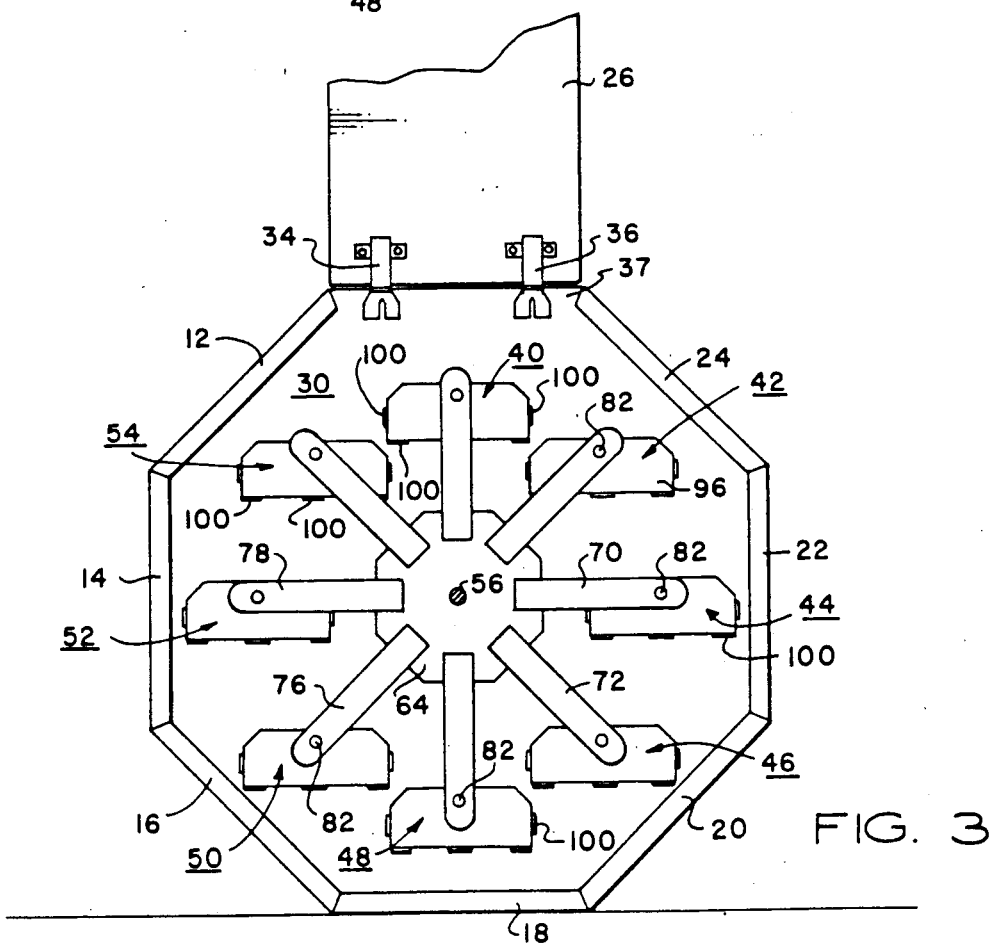
FIG. 3 is a sectional elevation as seen substantially along the lines 3—3 of FIG. 2.
Figure 2:
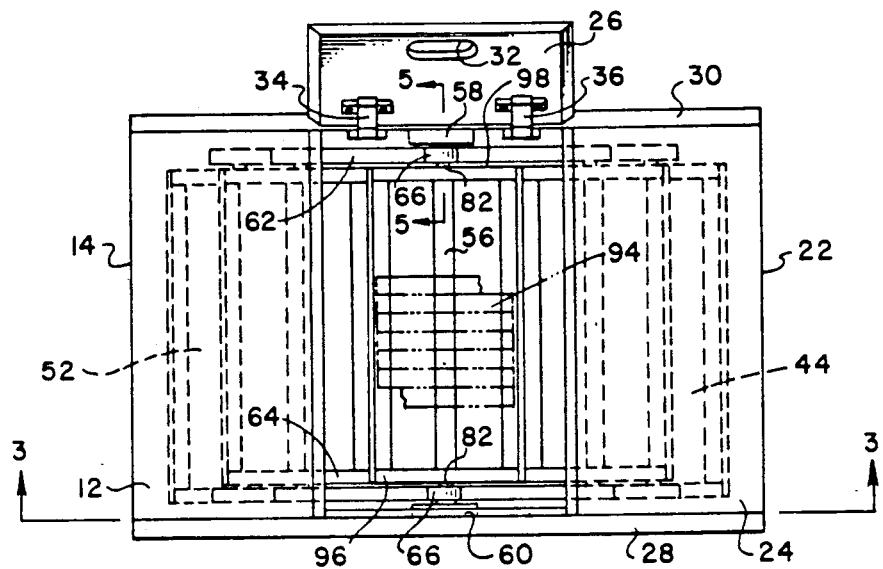
FIG. 2 is a plan view of the cabinet of FIG. 1.
Figure 4:
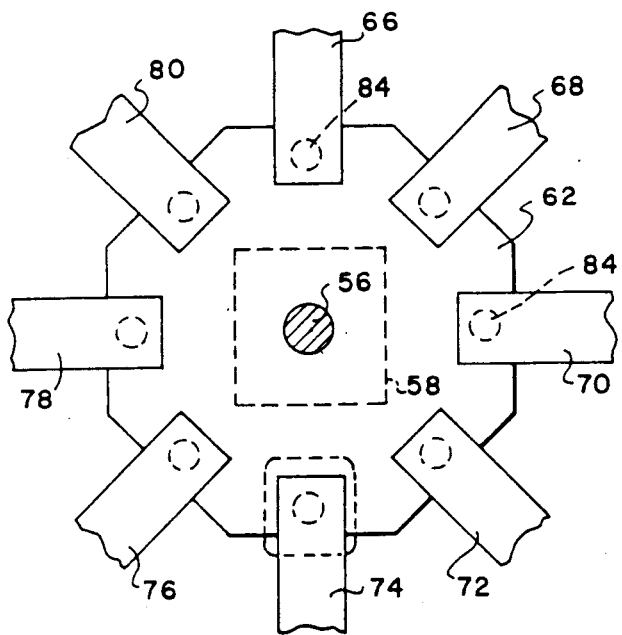
FIG. 4 is a fragmentary end-view enlargement of the rotational shelf support.

In the description which follows, like parts are marked throughout the specification and drawings with the same reference numerals respectively. The drawing figures are not necessarily to scale and in certain views parts may have been exaggerated for purposes of clarity.

Referring now to the drawings, the cabinet structure hereof designated 10 is preferably formed of wood and is comprised of a polygonal cross-section of four, six or eight sides. As here shown, the cabinet is octagonal and comprises outer face walls 12, 14, 16, 18, 20, 22, 24 and 26 secured between longitudinally spaced apart interfitting end walls 28 and 30. As illustrated, underlying face wall 18 in effect constitutes the bottom support portion of the free standing cabinet. Face wall 26 at the top comprises a displaceable door overlying access opening 37 leading to internal cavity 38. Door 26 includes a hand grip opening 32 and is secured at one end to end wall 30 via a pair of spring hinges 34 and 36.

Within internal cavity 38 of the cabinet are disposed a plurality of support shelves corresponding in quantity to the number of sides of the polygonal cross-section. For the octagonal cross-section illustrated, eight shelves are provided generally designated 40, 42, 44, 46, 48, 50, 52 and 54 to be described. The shelves are collectively supported in a displaceable ferris wheel relation for enabling rotation of the shelves progressively past opening 37. Providing the ferris wheel support is a longitudinally extending central dowel shaft 56 mounted for rotation through bore 57 of opposite bearing blocks 58 and 60 to a termination within recesses 63 in the end walls 28 and 30. Secured on the shaft near opposite ends for rotation therewith are spaced apart transverse support plates 62 and 64. The support plates, of octagonal configuration, are geometrically aligned with each other and to which are secured oppositely paired and aligned radial side arms 66, 68, 70, 72, 74, 76, 78 and 80.

The inner end of each side arm is received and secured in a router mortised slot formed in the respective support plates inward from the peripheral side faces thereof. Near the distal end of each side arm there is provided a laterally secured pin 82 which in cooperation with the mutually extending lateral pin 82 on the opposite arm face coaxially engage a shelf to define a pivot axis supporting a shelf therebetween in a floating relation. It will be appreciated in this arrangement that a rotational hand motion applied to a shelf or side arm through access opening 37 will urge all of the shelves to be progressively displaced rotationally about the axis of shaft 56 past the access opening.

Figure 5:
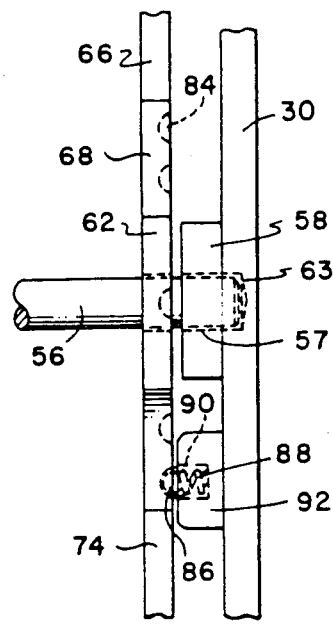
FIG. 5 is a fragmentary and enlarged sectional elevation as seen substantially along the lines 5—5 of FIG. 2.

For securing a selected shelf at the access opening, the back side of each of the side arms on support plate 62 (FIG. 5) includes a dimple recess 84. The recess is adapted to cooperate with a ball detent 86 biased laterally toward the recess by a compressed spring 88 disposed in a recess 90 of a block 92. In this manner, the shelves can be rotatably displaced and as each shelf reaches an uppermost position at access opening 37, the detent 86 will extend to engage within a dimple 84 located thereat so as to correspond with that position of the ferris wheel. Thereafter, as the arms are rotated away from dimple engagement, the detent ball is forced inwardly of recess 90. With the foregoing arrangement, the support plate can be rotated steppedly past the detent but should it be determined to position a selected tray at the access opening, the detent will retain the rotatable structure thereat. This also serves against inadvertent rotation past that point as might otherwise be caused by any weighted off balance imposed on the respective shelves.

In a preferred embodiment, the individual shelves are compartmentalized to receive video and/or audio cassettes 94 shown in phantom. For that purpose, each shelf is comprised of a compartmentalized tray-like configuration having end walls 96 and 98 joined front, rear and bottom by a plurality of transverse longitudinal runners 100. Between the end walls are a plurality of uniformly spaced upstanding partitions defining the individual juxtaposed storage compartments.

By the above description there is disclosed a novel shelf type furniture cabinet providing an abundance of shelf space in a compact construction. By means of the ferris wheel relation of the shelves, a plurality of shelves can be selectively brought progressively to the access opening of the cabinet beneath the access door 26. The virtues are many in enabling an abundance of different articles to be conveniently stored and selectively retrieved by a furniture item consuming a minimum of floor space particularly in living situations such as an apartment where floor space is at a premium. The shelving construction for the cabinet hereof is particularly advantageous when utilized for cassette storage in that a large number of cassettes can be stored in any convenient arrangement and selectively retrieved whenever the occasion arises. By means of the detent providing restraint against rotation, unevenly distributed shelf loading will not impose any undesired rotation of the shelving such that a selected shelf will be retained at the access opening until forcibly displaced therefrom. It will be appreciated that the cabinet hereof is particularly suited for the storing of cassettes in a highly compact arrangement.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:
1. A shelf type relatively stationary furniture cabinet for the storage of rectangular entertainment cassettes comprising:
an enclosed cabinet defining an internal cavity and including:
a pair of spaced apart sidewalls having a wood exterior; and
a plurality of center wall sections having a wood exterior intervening transversely between said side walls and contiguously arranged with respect to each other to collectively with said side walls form an enclosed cabinet of polygonal cross section;
a plurality of spaced shelves disposed within the majority volume of said cavity, said shelves being comprised of spaced end walls secured together by a plurality of underlying spaced apart parallel and rigid strips defining openings intervening therebetween; each of said shelves including a plurality of uniformly spaced upstanding and parallel partitions defining individual juxtaposed custom sized storage compartments for parallel aligned positioning of said rectangularly shaped entertainment cassettes to be individually stored and retrieved;
one of said center wall sections being hinge connected to a side wall to define a closable access opening to enable placing and retrieving said cassettes onto and from the storage compartments of said shelves;
support means for supporting said shelves in a ferris wheel relation so as to enable said shelves to be displaced within said cabinet progressively past said opening for affording user access thereto; said support means comprising:
a longitudinal shaft supported for rotation;
spaced apart transverse support plates mounted near each end of said shaft;
a plurality of circumferentially spaced arms extending cantilevered radially outward from each of said support plates in paired relations; and
lateral pin means in each pair of opposite arms mutually extending coaxially toward each other from near the distal end of said arms for defining a pivot axis supporting one of said shelves intervening in a floating relation between each of said arm pairs; and
releasable detent means for arresting rotation of said shelves to retain a selected shelf at an access station opposite said opening.

* * * * *